Sept. 3, 1940.  R. H. FLECKENSTEIN ET AL  2,213,907

METHOD OF PRECIPITATION

Filed Dec. 2, 1939

Raymond H. Fleckenstein
Albert T. Meries
INVENTORS

BY Edwin B. Connolly
ATTORNEY

Patented Sept. 3, 1940

2,213,907

UNITED STATES PATENT OFFICE 2,213,907

METHOD OF PRECIPITATION

Raymond H. Fleckenstein and Albert T. Mertes, Wilmington, Del., assignors to E. I. du Pont de Nemours & Company, Wilmington, Del., a corporation of Delaware Application December 2, 1939, Serial No. 307,272

1 Claim. (Cl. 23—1)

This invention relates to the art of metathesis. More particularly, it relates to the formation of solids by double decomposition of compounds in liquids. Still more particularly, it relates to an improved process for the precipitation of solids from liquids.

This application is a continuation-in-part of our previous application, Serial No. 221,866, filed on July 28, 1938.

Precipitation procedures are used widely for the production of such commodities as blanc fixe, calcium sulfate, lithopone, calcium carbonate, numerous pigment colors, and many other water-insoluble and slightly water-soluble materials. The usual method of producing such materials on the commercial scale is to add a liquid solution or suspension of one reacting compound through a pipe to a reacting liquid in a tank with such control of addition speed, reaction temperature, etc. as is necessary to obtain the physical condition desired in the precipitated materials. The precipitated solids are then usually removed from the mother liquors by filtration and are washed to remove undesirable soluble by-products and/or reactants, and are thereafter heat treated and wet and/or dry milled. In the case of blanc fixe, for example, sodium sulfate solution is added to barium sulfide solution or sulfuric acid is added to barium chloride solution in large agitated tanks. The precipitated barium sulfate is recovered by filtration and is washed as free as possible from the by-product sodium sulfide or hydrochloric acid. In the manufacture of calcium sulfate from hydrated lime and sulfuric acid, a suspension of the lime in water is added to the sulfuric acid solution and the resultant calcium sulfate is filtered and washed as free as possible from excess sulfuric acid. In the manufacture of lithopone, barium sulfide solution is reacted with zinc sulfate solution forming a precipitate of crude lithopone comprising barium sulfate and zinc sulfide in substantially equimolecular proportions, intimately associated as a composite precipitate. Said crude lithopone slurry is adjusted to the desired pH by addition of small amounts of barium sulfide solution or zinc sulfate solution and is then filtered and the crude lithopone calcined to develop its hiding power, suddenly quenched, and milled to form the finished lithopone of commerce.

The precipitation of crude lithopone has heretofore usually been accomplished by either a batch process, in which a predetermined amount of one of the solutions, preferably the zinc sulfate solution, is first introduced into a large precipitating tank and then a predetermined amount of the other solution is added with constant stirring, or by a simultaneous batch process in which both solutions are introduced simultaneously into a large precipitating tank at predetermined rates, or by a simultaneous continuous process in which the zinc sulfate and barium sulfide liquors are continuously added to a substantially constant volume of crude lithopone pulp in a precipitating tank, while crude pulp is continuously withdrawn from the tank. Other double decomposition precipitation reactions, such as the reactions between sodium sulfate and barium sulfide solutions, sulfuric acid and barium chloride solutions, sulfuric acid solution and aqueous lime suspension, ammonium sulfide and zinc sulfate solutions, zinc chloride and barium sulfide solutions, and barium sulfide and barium zincate solutions, and various reactions employed for the precipitation of calcium carbonate, numerous pigment colors, and many other water insoluble and slightly water-soluble materials, are accomplished by batch or continuous processes comparable to the hereinabove described crude lithopone precipitation processes.

The precipitation operation is one of the most important steps in the manufacture of such pigment materials as blanc fixe, calcium sulfate, lithopone, calcium carbonate, and the like, since it is the step which largely determines such important pigment properties as particle size, texture, etc. The precipitates formed by the usual prior art methods are flocculated to varying degrees due to the extreme variations in local concentrations of the reacting liquids. These flocculates usually enclose portions of the reacting liquids and also of the reaction by-products, and thereby render complete reaction and easy washing impossible. In the case of the blanc fixe example cited, even exhaustive washing to an impractical degree fails to remove the sodium sulfide by-product completely. Furthermore, in the case of calcium sulfate formation, the extreme variations in local concentrations result in local alkalinity with consequent precipitation on the calcium sulfate of iron and other color imparting acid soluble impurities in the sulfuric acid. The hereinbefore mentioned flocculates also have deleterious effects on the physical properties of the final product. For example, in the precipitation of crude lithopone by a simultaneous batch process, in which both solutions are introduced into a large precipitating tank at predetermined rates, the concentrations of each reacting liquor at the moment of reaction vary over a very wide range. Starting with an empty tank and running in equimolecular proportions of zinc sulfate and barium sulfide, it is obvious that when the tank is practically empty the concentrations of the reacting liquors are greater and the agitation more vigorous than when the tank is nearly filled with slurry toward the end of the precipitation operation. The concentration of the reacting liquors at the moment of reaction, which is determined by the concentration of said liquors entering the precipitating tank, by the position of the inlet pipes, by the composition of the precipitated crude lithopone slurry in said tank, and by the degree of agitation of said slurry, determines the character and particle size of the precipitate formed. As a consequence, the control of pigment particle size in such prior art simultaneous batch processes is difficult, if not impossible. The resulting prior art pigment consists of small particles formed during the first part of the precipitation operation, mixed with large particles formed toward the end of the precipitation, together with particles of optimum particle size formed during the portion of the precipitation operation when precipitation conditions are at an optimum. In practice it has been found that successive strikes made under apparently identical conditions produce crude lithopone which varies considerably in particle size and result in finished lithopones having widely different pigment properties. Another factor which adversely affects the pigment properties of lithopone is the variable composition of barium sulfide liquors employed in the crude lithopone precipitation operation. We have discovered that whereas freshly prepared barium sulfide liquor obtained by lixiviation of fresh black ash is a colorless solution comprising not more than traces of barium polysulfides, said liquor on exposure to air, for even a few hours, becomes quite yellow in color and comprises appreciable quantities of barium polysulfides. The quantity of polysulfide sulfur present is indicated by the intensity of the yellow color. We have discovered that the polysulfide sulfur content of barium sulfide liquors can be determined rapidly and accurately by titration of the hot liquors with standard sodium arsenite solution to a colorless endpoint. The arsenite combines with the polysulfide sulfur to form sodium thioarsenate according to the following equation:

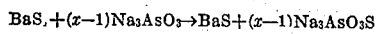

$$BaS_x + (x-1)Na_3AsO_3 \rightarrow BaS + (x-1)Na_3AsO_3S$$

We have found that a convenient method of analyzing barium sulfide liquors for polysulfide sulfur is to titrate 100 cubic centimeters of hot barium sulfide liquor with $0.2N\ Na_3AsO_3$ to a colorless endpoint when viewed against a white background, when

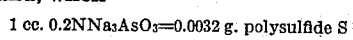

$$1\ cc.\ 0.2N\ Na_3AsO_3 = 0.0032\ g.\ \text{polysulfide S}$$

Freshly prepared barium sulfide liquors of the concentrations usually employed in crude lithopone precipitation, namely, from about 15° Bé. to about 30° Bé. concentration, usually contain less than about 0.05 gram polysulfide sulfur per liter. After standing exposed to air for even a few hours, the polysulfide sulfur content increases to from about 0.1 to about 0.5 gram per liter. Attempts to avoid formation of polysulfide sulfur in said liquors have been ineffectual or too expensive for practical operation. We have discovered that said polysulfide sulfur deleteriously affects the pigment properties of lithopone prepared therefrom, to a hitherto unrealized extent. During prior art crude lithopone precipitation operations said polysulfide sulfur is released, probably as colloidal sulfur, and is adsorbed on the crude lithopone particles. Upon calcination of said lithopone the sulfur associated therewith reacts with the zinc oxide, normally present in crude lithopone to the extent of from about 0.1% to about 0.3%, thereby destroying said zinc oxide. Prior to the calcination operation the crude lithopone is yellow in color and dries to a hard, gritty mass. After calcination, the resultant lithopone is light colored, but it retains a brownish cast. The pigment is deficient in zinc oxide and is very hard and gritty. As a consequence, the wet milling must be increased on account of the extreme hardness of the pigment. Furthermore, on account of the zinc oxide deficiency the pH of the pigment slurry is low, causing appreciable solution of the metal parts of the ball mill and/or of the flint pebbles used in said mill. As a result the pigment is seriously degraded in color and in certain instances cannot be sold as standard pigment.

The effect of polysulfide sulfur on lithopone pigment quality is shown in the following table in which are recorded the results obtained when two lithopone samples were prepared in our laboratory from the same barium sulfide and zinc sulfate liquors and under identical conditions, except that in one instance the barium sulfide liquor was employed immediately after it had been prepared and in the second case the barium sulfide liquor was allowed to age for a period of four hours prior to its use.

| BaS liquor | g./l. polysulfide S in BaS liquor | Percent ZnO in calcined lithopone |
| --- | --- | --- |
| Freshly prepared | 0.08 | .22 |
| Aged 4 hours | 0.33 | .05 |

Furthermore, the lithopone prepared from the fresh barium sulfide liquor had excellent color, whereas that prepared from the aged liquor was badly degraded in color.

It has been proposed to remove the sulfur from crude lithopone, obtained from polysulfide sulfur comprising barium sulfide liquors, by washing of said crude lithopone. However, attempts to remove the adsorbed sulfur by washing have been found to be ineffectual. It has also been suggested that the deleterious effects of this adsorbed sulfur could be overcome by addition of zinc oxide to the crude lithopone prior to its calcination. Such treatment has inhibited the deleterious effects of the sulfur contamination to a certain extent. However, since the polysulfide sulfur content of barium sulfide liquors varies over a very wide range, and since as a consequence the sulfur contamination of the resultant crude lithopones also varies widely, it is difficult, if not impossible when adding zinc oxide to counteract the deleterious effects of the sulfur, to maintain a proper balance between sulfur and zinc oxide in the crude lithopone entering the calcination chamber. Consequently, an extremely non-uniform lithopone pigment is obtained, a portion of which comprises an excess of zinc oxide, and hence causes undue thickening in reactive paint vehicles, and another portion of which is treated with insufficient zinc oxide, and as a consequence is gritty and of poor color.

This invention has as an object the improvement of the conditions of formation of solids from reacting liquors. A further object is the elimination of extreme variations in the local concentrations of the reacting liquors. A still further object is to improve the intimacy of contact between the reacting liquors. A still further object is the double decomposition of essentially all of the reactants. A still further object is the reduction of the flocculation and aggregation of the solid reaction products. A still further object is to improve the washing characteristics of the precipitated materials. A still further object is the improvement of the physical properties of the finished products. A still further object is the production of improved lithopone pigment from polysulfide sulfur contaminated barium sulfide liquors. Additional objects will become apparent from an examination of the following description and claim.

These and other objects and advantages are accomplished by the following invention, which broadly comprises forcing one of the reacting liquors by means of a jet nozzle through a body of a gas, whereby the film of gas intimately surrounding the solid liquid jet has imparted to it a high inertia by virtue of the same velocity as the liquid jet, and is carried and driven with the liquid jet into the body of the other reacting liquor. The high inertia gas film is sheared from the jet after introduction within the body of said liquor and the gas bubbles dispersed through said body of liquor before being released.

In a more restricted sense this invention comprises forcing a reacting liquor by means of a jet nozzle at a velocity of at least about 40 feet per second, through a body of a gas into the body of the other reacting liquor, said jet nozzle delivering said liquor at less than about 12 inches from the surface of the body of the said liquor.

A preferred embodiment of this invention comprises forcing the two reacting liquors, say sulfuric acid and barium chloride solution, into a body of a slurry of the precipitate had as a result of the reaction between said reacting liquors through separate jet nozzles delivering said liquors at less than about 6 inches from the surface of the body of said slurry at a velocity of at least about 40 ft. per second, whereby said liquors are delivered through atmospheric air into the body of said slurry.

In describing our invention in detail, we shall first describe the illustrated precipitation devices embodying it in its preferred forms so far as it relates to apparatus, but although we describe the invention by reference to such illustrated apparatus it will be understood that we do not restrict it thereto. In the accompanying drawing of these precipitation devices:

No. 1 in these figures is a container comprising a body of liquor 2, above which is a body of gas 3. Reacting liquor is forced into jet 4, spaced less than about 6 inches from the surface of the liquor 2, from which jet said reacting liquor emerges at a velocity of at least about 40 feet per second into the body of the gas 3, forming thereby a film of gas around the liquid jet which, due to its velocity, enters into the body of the liquor 2 where the gas is released, thereby agitating the reactants and, in certain instances, combining with undesirable impurities in the reaction mixture.

Figure 1:
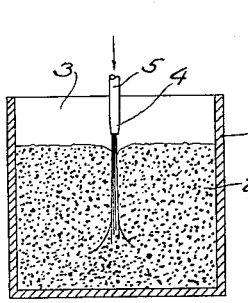
Fig. 1 is a diagrammatic illustration of one arrangement of apparatus adapted for the practice of the invention in a batch precipitation operation.
Figure 2:
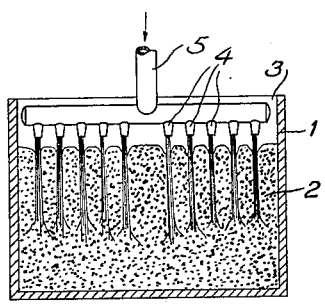
Fig. 2 is a diagrammatic illustration of another arrangement of apparatus adapted for a batch precipitation operation.

In practicing our invention in apparatus such as is illustrated in Fig. 1 and Fig. 2, a predetermined amount of one of the reacting liquors is fed into tank 1. Subsequently, the other reacting liquor is forced through conduit 5 into jets 4 from which it is forced at high velocity through the body of air 3 into the liquor in reaction tank 1.

Figure 3:
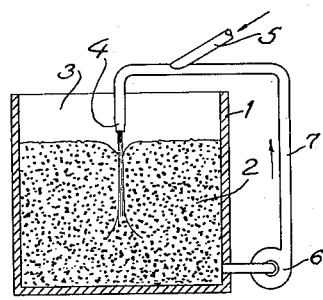
Fig. 3 is a diagrammatic illustration of a slightly modified apparatus also adapted for a batch precipitation operation.

In practicing our invention in apparatus such as is illustrated in Fig. 3, one of the reacting liquors is introduced through conduit 5 while the other reacting liquor mixed with the reaction products is forced by pump 6 through conduit 7 where it is mixed with the first reacting liquor and discharged through nozzle 4 into the body of liquor 2 in tank 1 through a body of air 3.

Figure 4:
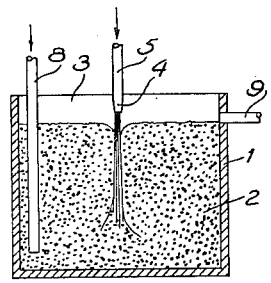
Fig. 4 is a diagrammatic illustration of another arrangement of apparatus adapted for a simultaneous continuous precipitation operation.

In practicing our invention in apparatus such as is illustrated in Fig. 4, wherein precipitation is effected by a simultaneous continuous operation, one of the reacting liquors is flowed continuously at a substantially constant rate into the reaction tank 1 through conduit 8 while the other reacting liquor is forced through conduit 5 and jet 4 through a body of air 3 into the reaction mixture 2. The reaction mixture level in the tank 1 is always kept at a constant point, nearly tank full, and the suspension of reaction product or products is withdrawn continuously through the overflow launder 9.

Figure 5:
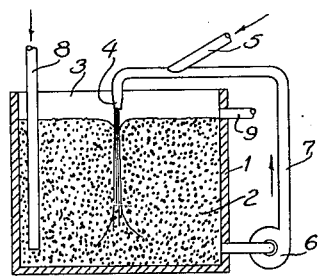
Fig. 5 is a diagrammatic illustration of a slightly modified apparatus also adapted for a simultaneous continuous precipitation operation.

In practicing our invention in apparatus such as is illustrated in Fig. 5, one of the reacting liquors is flowed continuously at a substantially constant rate into the mixing tank 1 through conduit 8, and the reaction mixture is forced by pump 6 at a substantially constant rate through conduit 7 while the other reacting liquor is forced through conduit 5 into conduit 7, the resultant mixture then being forced through jet 4 through a body of air 3 into the reaction mixture 2. The reaction mixture level in the tank 1 is always kept at a constant point, nearly tank full, and the suspension of reaction products is withdrawn continuously through the overflow launder 9.

Figure 6:
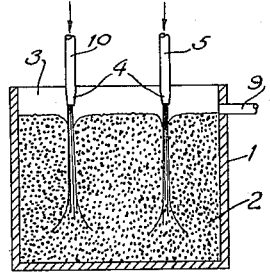
Fig. 6 is a diagrammatic illustration of another arrangement of apparatus adapted for a simultaneous continuous precipitation operation wherein both reactants are forced through jet nozzles into the reaction tank.

In practicing our invention in apparatus such as is illustrated in Fig. 6 which is particularly adapted for the precipitation of pigment materials, one of the reacting liquors is introduced through conduit 5 and the other reacting liquor through conduit 10 into jet nozzles 4, being forced at high velocity through a body of air 3 into the reaction mixture 2. The reaction mixture level in the tank 1 is always kept at a constant point, nearly tank full, and the reaction product suspension is withdrawn continuously through the overflow launder 9.

Figure 7:
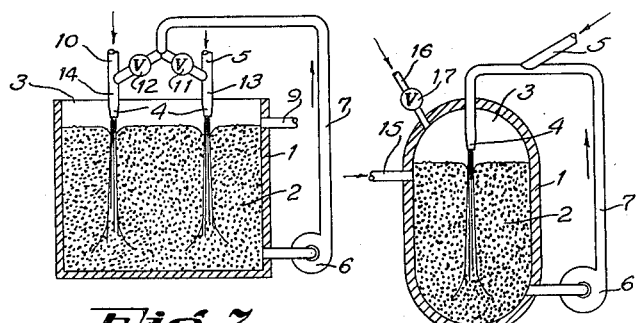
Fig. 7 is a diagrammatic illustration of a slightly modified apparatus particularly adapted for simultaneous continuous precipitation of pigment materials, wherein both reactants are forced through jet nozzles into the reaction tank.

In practicing our invention in apparatus such as is illustrated in Fig. 7, which is the preferred arrangement of apparatus for the precipitation of pigment materials, one reacting liquor is introduced through conduit 5 while the other reacting liquor is introduced through conduit 10. The reaction mixture 2 is forced by pump 6 at a predetermined rate through conduit 7 where a predermined proportion of the reaction mixture is forced through valve 11 and mixed in conduit 13 with one of the reacting liquors and the remainder of the reaction mixture is forced through valve 12 and mixed in conduit 14 with the other reacting liquor, both mixtures then being forced through jet nozzles 4, through a body of air 3 into the reaction mixture 2. The reaction mixture level in the tank 1 is always kept at a constant point, nearly tank full, and the reaction product suspension is withdrawn continuously through the overflow launder 9.

Figure 8:
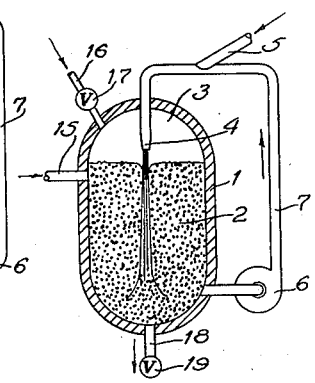
Fig. 8 is a diagrammatic illustration of another arrangement of apparatus, useful particularly for a simultaneous continuous precipitation operation when a gas other than air at atmospheric pressure is employed.
Figure 9:
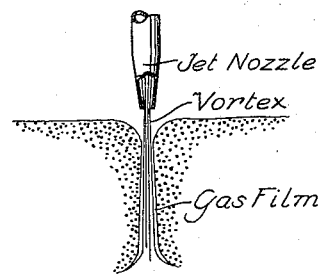
Fig. 9 is a detailed view of the stream of reacting liquor impinging upon the surface of the other reacting liquor.

The apparatus of Fig. 8 is closed so as to permit the employment of gases other than air at atmospheric pressure. It is particularly adapted in instances where it is desired to employ gases at pressures other than atmospheric or to employ gases other than air at atmospheric pressure. In practicing our invention in apparatus such as is illustrated in Fig. 8, one reacting liquor is flowed continuously at a substantially constant rate into the enclosed mixing tank 1 through conduit 15 and the reaction mixture is forced by pump 6 at a substantially constant rate through conduit 7 while the other reacting liquor is forced through conduit 5 into conduit 7, the resultant mixture then being forced through jet 4 through a body of gas 3 into the reaction mixture 2. Additional gas as required is admitted through pipe 16 and valve 17 connected with a supply of the gas. The reaction mixture level in the tank 1 is always kept at a constant point, nearly tank full, and the suspension of reaction products is withdrawn continuously through pipe 18 and valve 19.

Various arrangements and selections of equipment for the operation of our novel process are possible. In the preferred arrangement of apparatus for precipitation of lithopone, for example, illustrated in Fig. 7, we employ a mixing tank 1 having a diameter of 32 in. and a capacity up to the overflow line of 127 gallons, other dimensions being proportionate as shown. The reaction mixture 2 is forced through pump 6 and valves 11 and 12 at substantially constant rates while barium sulfide solution, at a substantially constant temperature in the range of from about 60° C. to about 80° C. containing a substantially constant amount of BaS in the range of from about 150 to about 300 grams BaS per liter, is flowed continuously at a substantially constant rate in the range of from about 35 to about 75 gallons per minute through conduit 10 into conduit 14. The zinc sulfate solution at a substantially constant temperature in the range of from about 40° C. to about 55° C., containing a substantially constant amount of $ZnSO_4$ in the range of from about 300 to about 600 grams $ZnSO_4$ per liter, is flowed continuously into conduit 13 through conduit 5 at a substantially constant rate, such that the pH of the overflow crude lithopone slurry is in the range of from about 3.5 to about 10. The resultant mixtures in conduits 13 and 14 comprising, respectively, zinc sulfate and barium sulfide in excess are forced through jet nozzles 4 and 4, through a body of air 3 into the reaction mixture 2 at velocities of at least about 40 feet per second, said jet nozzles delivering said liquors at less than about 6 inches from the surface of the body of the reaction mixture. Crude lithopone pulp having a substantially constant temperature in the range of from about 65° C. to about 95° C. is allowed to overflow at a substantially constant rate through the overflow launder 9, when it is conducted to a finishing tank where it is then finished in the usual manner, being adjusted to a pH of between about 4 and about 12 by addition of appropriate small amounts of barium sulfide or zinc sulfate solution, and being subsequently filtered, dried, calcined, quenched, wet milled, filtered, dried, and dry milled to provide an improved finished lithopone of commerce.

The following examples are given for illustrative purposes and are not intended to place any restrictions or limitations on the herein described invention.

*Example I*

Using an arrangement of apparatus designed as shown in Fig. 5, with the mixing tank 1 having a capacity up to the level of the overflow launder 9 of 127 gallons, and other dimensions being proportionate as shown, 175.2 grams per liter barium sulfide solution comprising 1 gram polysulfide sulfur per liter was fed at a temperature of 78° C. through conduit 8 at a rate of 62.2 gallons per minute, while 350.9 grams per liter zinc sulfate solution at 50° C. was fed through conduit 5 at a rate of 29.6 gallons per minute, the reaction mixture 2 being forced through pump 6 at a rate of 150 gallons per minute. Jet 4 was spaced 3 inches above the body of the reaction mixture 2, the zinc sulfate containing solution being forced out of said jet at a velocity of 50 feet per second through a body of air 3 into the reaction mixture 2. Crude lithopone pulp having a pH of 7 and a temperature of 81° C. was allowed to overflow at a substantially constant rate through the overflow launder 9. Said crude lithopone, which was uniform in particle size and white in color, was adjusted to a pH of 8.8 by addition of appropriate small amounts of barium sulfide solution. Subsequently, it was filtered, dried to 5% moisture content, calcined at 870° C. in a furnace such as described in U. S. Patent 1,584,381, and quenched by spraying with water and immediately thereafter dropping it into a quenching body of water. The calcined lithopone was wet milled, filtered, dried and dry milled. The resultant finished lithopone was of excellent color and texture, contained 0.24% zinc oxide, and was eminently fitted for use in lithopone paint manufacture.

A second lot of lithopone was made from the same barium sulfide and zinc sulfate liquors under conditions identical with those existing during the preparation of the hereinabove described pigment produced by our novel process, with the exception that during the precipitation operation jet nozzle 4 was replaced by a large tube extending below the surface of the reaction mixture, according to prior art practice. The resultant crude lithopone, prepared according to said prior art practice, was yellow in color, and upon calcination and finishing it formed a finished lithopone pigment which contained only 0.05% zinc oxide and was of such poor color and so gritty that it could not be used in lithopone paint manufacture.

*Example II*

Using an arrangement of apparatus designed as shown in Fig. 2 with the mixing tank 1 having a diameter of 12 feet 8 inches and a height of 9 feet 5 inches, 3400 lbs. of 59° Bé. sulfuric acid at a temperature of 25° C. was forced at the rate of 170 lbs. per minute through conduit 5 and jets 4 into a chemically equivalent quantity of barium chloride solution comprising 55 grams $Ba^{++}$ per liter and having a temperature of 42° C. Jets 4 were spaced 9 inches above the body of the reaction mixture 2, the sulfuric acid being forced out of said jets at a velocity of 60 ft./sec. through a body of air 3 into the reaction mixture 2. Upon completion of the sulfuric acid addition the resultant barium sulfate slurry had a temperature of 50° C. Said barium sulfate slurry was filtered, washed with water to a pH of 5, and was then blended with a slurry of good quality calcined wet-milled pigment titanium dioxide in the proportion of 30 parts by weight titanium dioxide to 70 parts by weight barium sulfate. The barium sulfate was uniformly small in particle size and substantially free from flocculates and occluded impurities. When washed on a filter it washed more slowly than did barium sulfate prepared by prior art processes, i. e., on account of its smaller particle size it prevented as rapid passage of the wash water through the filter cake, but after washing with a limited amount of water it was substantially free from residual impurities. When mixed with titanium dioxide as aforesaid, a blended pigment resulted having the desirably high oil absorption of 17.8 as determined by the oil absorption testing procedure more particularly described in U. S. Patent 2,125,342. Furthermore, substantially no separation of the titanium dioxide and barium sulfate occurred when a suspension of said blended pigment comprising 50 parts by weight pigment, 1.52 parts by weight sodium silicate (3.25 $SiO_2.1Na_2O$), and 510 parts by weight water, was agitated and allowed to stand for a period of 6 hours. Moreover, there was little if any tendency toward hard caking when paints comprising said blended pigment were stored in cans for a period of several months.

A second lot of barium sulfate was made from the same sulfuric acid and barium chloride solution and blended with the same pigment titanium dioxide under conditions identical with those existing during the preparation of the hereinabove described pigment material produced by our novel process, with the exception that during the precipitation operation jet nozzles 4 were replaced by a large tube extending below the surface of the reaction mixture, according to prior art practice. The resultant barium sulfate varied widely in particle size, its average particle size being substantially greater than that of the product of our novel process. Furthermore, said barium sulfate, prepared according to said prior art practice, was flocculated to a large extent and occluded substantial amounts of impurities. When washed on a filter it washed 15% more rapidly than did the barium sulfate of our novel process, but even after washing with large amounts of water it comprised substantial amounts of residual impurities. When mixed with titanium dioxide, a blended pigment resulted having the undesirably low oil absorption of 14.7. Furthermore, when a suspension of said blended pigment comprising 50 parts by weight of pigment, 1.5 parts by weight sodium silicate (3.25 $SiO_2.1Na_2O$), and 510 parts by weight water, was agitated and allowed to stand for a period of 6 hours, substantial separation of said blended pigment occurred, the barium sulfate fraction thereof settling much more rapidly than the titanium dioxide. Moreover, when paints comprising said blended pigment were stored in cans for a period of several months the barium sulfate fraction thereof settled to form hard cakes on the bottom of the cans which could only be reincorporated in said paints with difficulty.

*Example III*

Using an arrangement of apparatus designed as shown in Fig. 1 with the mixing tank 1 having a capacity of 10,000 gals., there was added lime slurry comprising 18% CaO to 27,000 lbs. of 60° Bé. sulfuric acid in said tank, said lime slurry being forced through jet 4 at the rate of 1500 lbs. per minute in amount sufficient to neutralize 94% of said acid. Jet 4 was spaced 6 in. above the body of the reaction mixture 2, the lime slurry being forced out of said jet at a velocity of 50 ft./sec. through a body of air 3 into the reaction mixture 2. The reaction mixture attained a maximum temperature of 125° C. during the lime slurry addition period. After addition of said lime slurry the reaction mixture was diluted with water to provide a mixture comprising sulfuric acid in the amount of 15 grams $H_2SO_4$ per liter. The reaction mixture thus had comprised calcium sulfate of which 95% was in the form of anhydrite while 5% was in the form of gypsum. Thereafter, the reaction mixture was boiled for a period of 1 hour whereupon substantially all of the gypsum in the same was converted to anhydrite. The anhydrite slurry was filtered, washed with water to a pH of 5, and was then blended with a slurry of good quality calcined wet-milled pigment titanium dioxide in the proportion of 30 parts by weight titanium dioxide to 70 parts by weight calcium sulfate. The anhydrite was uniformly small in particle size and substantially free from flocculates and occluded impurities. When washed on a filter it washed more slowly than did anhydrite prepared by prior art processes, i. e., on account of its smaller particle size it prevented as rapid passage of the wash water through the filter cake, but after washing with a limited amount of water it was substantially free from residual impurities. When mixed with titanium dioxide as aforesaid, a blended pigment resulted having excellent color, and the desirably high oil absorption of 32 as determined by the oil absorption testing procedure more particularly described in U. S. Patent 2,125,342.

A second lot of anhydrite was made from the same lime slurry and sulfuric acid and blended with pigment titanium dioxide under conditions identical with those existing during the preparation of the hereinabove described pigment material produced by our novel process, with the exception that during the precipitation operation jet nozzle 4 was replaced by a large tube extending below the surface of the reaction mixture, according to prior art practice. The resultant anhydrite comprised particles of widely varying sizes, its average particle size being markedly greater than that of the anhydrite produced by our novel process. Furthermore, said anhydrite, prepared according to said prior art practice, was badly flocculated and comprised substantial amounts of occluded impurities. When washed on a filter it washed more rapidly than did the anhydrite prepared by our novel process but even after washing with large amounts of water it comprised substantial amounts of residual impurities. When mixed with titanium dioxide a blended pigment resulted having poor color, and an undesirably low oil absorption of 27.

Example IV

Using an arrangement of apparatus designed as shown in Fig. 6 with the mixing tank 1 having a capacity up to the level of the overflow launder 9 of 127 gals., and other dimensions being proportionate as shown, 25° C. titanium sulfate hydrolysis residual liquor comprising 200 grams $H_2SO_4$ and 25 grams $Fe^{++}$ per liter was forced at a rate of 40 gals./min. through conduit 5 while 25° C. lime slurry comprising 75 gms. CaO per liter was forced at a rate of 60 gals./min. through conduit 10. Jets 4 and 4 were spaced 3 in. above the body of the reaction mixture 2, the sulfuric acid solution and the lime slurry being forced out of said jets at velocities of 50 ft./sec. through a body of air 3 into the reaction mixture 2. The gypsum slurry thereby produced was allowed to overflow at a substantially constant rate through the overflow launder 9. Said gypsum slurry was filtered and washed with water to a pH of 5. The gypsum was uniformly small in particle size, was of excellent color, and was substantially free from flocculates and occluded impurities. When washed upon a filter it washed more slowly than did gypsum prepared by prior art processes, but after washing with a limited amount of water it was substantially free from residual impurities.

A second lot of gypsum was made from the same titanium sulfate hydrolysis residual liquor and lime slurry under conditions identical with those existing during the preparation of the hereinabove described pigment material produced by our novel process with the exception that during the precipitation operation jet nozzles 4 and 4 were replaced by large tubes extending below the surface of the reaction mixture, according to prior art practice. The resultant gypsum comprised particles of widely varying sizes, its average particle size being markedly greater than that of the gypsum had by our novel process. Furthermore, said gypsum, prepared according to said prior art practice, was badly flocculated and comprised substantial amounts of occluded impurities. When washed on a filter it washed more rapidly than did gypsum prepared by our novel process, but after washing with large amounts of water it still comprised substantial amounts of residual impurities, particularly basic compounds of iron precipitated on and in the gypsum particles as a result of extreme variations in local concentrations of the reacting liquors, more especially as a result of local alkalinity caused by excess lime slurry in localized portions of the reaction mixture. Said washed gypsum was yellow in color and quite unsuited for use as a pigment material.

It is to be understood that the herein disclosed specific embodiments of our invention may be subjected to variation and modification without departing from the scope thereof. For instance, while we prefer to employ a precipitating device such as that illustrated in Fig. 7, other types of precipitating devices may be used. Thus, the precipitating devices illustrated in our drawing as well as others may be employed. While we ordinarily prefer to deliver the reacting liquor through a single jet nozzle, it is to be understood that a plurality of said nozzles may be employed for the delivery of said reacting liquor through a gas into the reaction mixture, as illustrated, for example, in Fig. 2.

The distance of the jet nozzle from the surface of the body of the reaction mixture and the velocity of the reacting liquor being delivered through the jet nozzle may vary widely provided that they are so regulated that a vortex is formed in the reaction mixture. Appreciable effects are obtained when the jet nozzle delivers the liquid stream at a distance of about 12 inches from the surface of the reaction mixture. However, increased effects are obtained at decreased distances and it is preferred to have said jet nozzle deliver said liquid stream at a distance of about 6 inches or less from the surface of the body of said reaction mixture and at a velocity of at least about 40 feet per second. When relatively small distances between jet nozzle and reaction mixture (of the order of the lower portion of the range given) are employed use of lower velocities (of the order of about 40 ft. per second) will be found to be more desirable, whereas with larger distances higher velocities will be required.

When practicing our invention in a batch operation in apparatus such as is illustrated in Figs. 1, 2, and 3, it is preferred that the reaction tank 1 should have a capacity of as high as about 2000 gallons or more. However, when employing our novel process in a simultaneous continuous precipitation operation in apparatus such as is illustrated in Figs. 4, 5, 6, 7, and 8, it is preferred that the reaction tank 1 should have a capacity of not more than about 150 gals., and further, that the total volume of reactants entering said tank per minute should be not less than about one-third the volume of said tank.

We have found that liquid pressures of from about 30 to about 60 pounds per square inch in the jet are satisfactory for most purposes. With lower pressures the formation of gas bubbles and turbulence created is considerably less than with higher pressures. While turbulence is increased and the quality of the precipitants improved, and in the case of lithopone precipitation, for example, the removal of harmful sulfur compounds is expedited by higher pressures, the increased power consumption may not be economical. It is preferred, as stated herein, that the liquid stream emerge from the jet nozzle at a velocity of at least 40 feet per second.

While it is preferred in most instances that the gas employed shall be air at atmospheric temperature and pressure, it is to be understood that gases other than air, such as nitrogen, carbon monoxide, hydrogen, helium, and the like, which are only very slightly soluble in the liquid, may be employed. Furthermore, while we prefer to employ gases at atmospheric pressure, especially when using air, it is to be understood that sub-atmospheric pressures and pressures greater than atmospheric may be employed.

The theory of the invention is that the beneficial effects obtained therefrom are due not only to the extremely fine bubbles produced, but are also due to the violent agitation or shearing action of the jet against the liquor, destroying the gas film between the two. Close observation of the nature of the vortex produced where the jet enters the liquor shows a gas space about 1/16 in. around the solid jet. This gas space or film extends some distance below the surface and is in some respects an ejector or aspirator made from liquid. A strong suction of gas is produced near the jet as shown by the fact that a match is quickly extinguished when held near the vortex, the flame being drawn into the vortex. In this manner, a combination of gas and liquid is forced into the body of said liquid, so that the gas is released therein and has to travel through a substantial body of said liquid before escaping into the atmosphere. As a consequence, violent agitation of the reactants is obtained with consequent improvement in the quality of the solid reaction products. Furthermore, in cases such as the precipitation of crude lithopone from zinc sulfate and polysulfide sulfur contaminated barium sulfide liquor, the combination of shearing action and fine bubble formation, when employing air as the gas, results in the conversion of the polysulfide sulfur to an innocuous form, probably barium sulfate. This latter result is surprising in view of the fact polysulfide sulfur formation in barium sulfide solutions is accelerated when said solutions are stored in contact with air, as in storage tanks.

While our invention is particularly adapted to the manufacture of pigment materials, for example, such pigment materials as barium sulfate, lithopone, zinc sulfide, calcium sulfate, calcium carbonate, and the like, it is to be understood that it is also adapted to many other double decomposition precipitation processes involving reactions between reacting liquors and the formation of substantially insoluble solids. The term "reacting liquor" as employed herein and in the appended claim includes all mobile liquid systems comprising reacting compounds, and includes pure liquids such as for example, water, solutions such as for example, an aqueous solution of sodium sulfate, suspensions such as for example, an aqueous calcium hydroxide suspension, and dispersed sols such as for example, a tin oxide sol; while the term "body of liquor" designates the body of reacting liquor or body of reaction mixture or body of slurry of reaction products into which the jet of said reacting liquor is forced.

Examples of solids contemplated for precipitation according to our invention, and of the reacting liquors employed in the precipitation thereof, include, aluminum hydroxide precipitated by reaction between solutions of sodium aluminate and sulfuric acid; basic aluminum acetate by reaction between aluminum hydroxide slurry and acetic acid; aluminum abietate from solutions of aluminum sulfate and sodium abietate; aluminum palmitate from solutions of aluminum sulfate and sodium palmitate; aluminum stearate from solutions of aluminum sulfate and sodium stearate; golden antimony sulfide from solutions of sodium thioantimonate and sulfuric acid; barium carbonate from solutions of barium chloride and ammonium carbonate; barium chromate from solutions of barium nitrate and sodium chromate; barium fluoride from solutions of barium sulfide and hydrofluoric acid; barium fluosilicate from solutions of barium hydroxide and fluosilicic acid; barium sucrate from barium hydroxide solution and molasses; barium sulfate from a reacting liquor containing a barium compound and a reacting liquor containing a soluble sulfate, for example, a barium carbonate suspension and sulfuric acid, barium sulfide and sodium sulfate solutions, a barium chloride solution and sulfuric acid, barium chloride and sodium sulfate solutions, a barium peroxide suspension and sulfuric acid, a barium sulfide solution and sulfuric acid, and the like; bismuth beta-naphtholate from sodium beta-naphtholate solution and acetic acid solution of bismuth nitrate; bismuth subcarbonate from solutions of bismuth nitrate and ammonium carbonate; bismuth hydroxide from solutions of bismuth nitrate and sodium hydroxide; bismuth subnitrate by reaction between acidified bismuth nitrate solution and water; bismuth oxychloride by reaction between slightly acid bismuth chloride solution and water; bismuth oxyiodide by reaction between slightly acid solution of bismuth iodide and water; bismuth subsalicylate from bismuth hydroxide slurry and salicyclic acid; cadmium lithopone from solutions of cadmium sulfate and barium sulfide; calcium abietate from solutions of sodium abietate and calcium chloride; calcium arsenate from solutions of sodium arsenate and calcium chloride; calcium carbonate from a reacting liquor containing a calcium compound and a reacting liquor containing a soluble carbonate, for example, calcium chloride and sodium carbonate solutions, a calcium sulfate suspension and an ammonium carbonate solution, a calcium hydroxide suspension and a sodium carbonate solution, and the like; calcium lithopone from calcium sulfide suspension and zinc sulfate solution; calcium stearate from solutions of sodium stearate and calcium chloride; calcium sucrate from calcium hydroxide suspension and molasses; calcium palmitate from solutions of sodium palmitate and calcium chloride; dicalcium phosphate from solutions of disodium phosphate and calcium chloride; tricalcium phosphate from trisodium phosphate solution and ammonium hydroxide comprising calcium chloride solution; calcium sulfate from a reacting liquor containing a calcium compound and a reacting liquor containing a soluble sulfate, for example, a calcium hydroxide suspension and sulfuric acid, a calcium sulfide suspension and sulfuric acid, a calcium carbonate suspension and sulfuric acid, calcium chloride and sodium sulfate solutions, and the like; satin white from calcium hydroxide suspension and aluminum sulfate solution; cobaltous hydroxide from solutions of cobaltous nitrate and sodium hydroxide; cobaltous linoleate from solutions of cobaltous chloride and sodium linoleate; cobaltous oleate from solutions of cobaltous chloride and sodium oleate; cobaltous resinate from solutions of cobaltous chloride and sodium resinate; cuprous cyanide from solutions of potassium cyanide and cupric sulfate; cuprous iodide from solutions of potassium iodide and cupric sulfate; cupric oleate from solutions of cupric sulfate and sodium oleate; cupric resinate from solutions of cupric sulfate and sodium resinate; cupric stearate from solutions of cupric sulfate and sodium stearate; Paris green from suspensions of basic cupric acetate and arsenic trioxide; basic ferric acetate from ferric hydroxide suspension and acetic acid; ferric hypophosphite from solutions of sodium hypophosphite and ferric chloride; ferrous oxalate from solutions of ferrous sulfate and ammonium oxalate; ferrous oxide from ferrous oxalate suspension and potassium hydroxide solution; brown iron oxide from solutions of ferrous sulfate and sodium carbonate; yellow umber from ferrous sulfate solution and calcium hydroxide suspension; ferric phosphate from solutions of trisodium phosphate and ferric chloride; ferrous phosphate from solutions of ferrous sulfate and trisodium phosphate; ferric pyrophosphate from solutions of ferric citrate and tetrasodium pyrophosphate; ferrous ferrocyanide from solutions of ferrous sulfate and sodium ferrocyanide; lead arsenate from solutions of lead chloride and sodium arsenate; lead chromate from solutions of lead chloride and potassium dichromate; lead chloride from solutions of lead nitrate and hydrochloric acid; lead iodide from solutions of lead nitrate and potassium iodide; lead linoleate from solutions of lead nitrate and sodium linoleate; lead oleate from solutions of lead nitrate and sodium oleate; lead resinate from solutions of lead nitrate and sodium resinate; lead stearate from solutions of lead acetate and sodium stearate; lead sulfate from solutions of lead nitrate and sodium sulfate; lithium carbonate from solutions of lithium chloride and sodium carbonate; magnesium hydroxide from magnesium sulfate and sodium hydroxide solutions, magnesium chloride solution and calcium hydroxide suspension, and the like; magnesium palmitate from solutions of magnesium sulfate and sodium palmitate; magnesium stearate from solutions of magnesium sulfate and sodium stearate; magnesium sucrate from magnesium hydroxide suspension and molasses; manganese resinate from solutions of manganese sulfate and sodium resinate; manganese arsenate from solutions of sodium arsenate and manganese sulfate; manganese carbonate from solutions of manganese sulfate and sodium carbonate; manganese glycerophosphate from manganese hydroxide slurry and glycerophosphoric acid; manganese hydroxide from solutions of manganese sulfate and sodium hydroxide; manganese linoleate from solutions of manganese sulfate and sodium linoleate; mercuric iodide from solutions of mercuric chloride and potassium iodide; mercurous iodide from solutions of mercurous nitrate and potassium iodide; nickel carbonate from solutions of nickel sulfate and sodium carbonate; silver chloride from solutions of silver nitrate and sodium chloride; strontium sulfate from solutions of strontium sulfide and sulfuric acid; precipitated tin oxide from tin oxide sol and sulfuric acid solution; zinc abietate from solutions of zinc sulfate and sodium abietate; zinc arsenate from solutions of zinc sulfate and sodium arsenate; zinc arsenite from solutions of zinc sulfate and sodium arsenite; basic zinc carbonate from solutions of zinc sulfate and sodium carbonate; zinc chromate from solutions of zinc sulfate and potassium dichromate; zinc cyanide from solutions of zinc sulfate and potassium cyanide; zinc fluoride from solutions of zinc acetate and sodium fluoride; zinc palmitate from solutions of zinc sulfate and sodium palmitate; zinc stearate from solutions of zinc sulfate and sodium stearate; zinc sulfide from solutions of ammonium sulfide and zinc sulfate, zinc chloride and barium sulfide, barium sulfide and barium zincate, and the like; lithopone from solutions of barium sulfide and zinc sulfate; and, various reactions employed for the precipitation of numerous pigment colors, and other water insoluble and slightly water soluble materials. Furthermore, our invention may be employed in the preparation of treated pigment materials, as for example, in the preparation of silica coated lithopone by reacting sodium silicate solution and sulfuric acid in the presence of a lithopone slurry and thereby effecting precipitation of silica on the surface of the lithopone particles.

Our process possesses advantages not previously combined in a single precipitation process. Furthermore, the precipitated products of our novel process possess advantages not previously combined in such precipitated commodities. On account of the reduction of the extreme variations in local concentrations of the reacting liquids, contamination of the precipitated solid material with soluble and/or insoluble reactants and/or by-products of the reaction is reduced markedly. Because of the greater intimacy of contact between the reactants metathesis may be carried essentially to completion. As a consequence, removal of reactants and by-products by washing of the filtered solid reaction products may be effected more readily. Furthermore, aggregation of the precipitated solid material is reduced and its particle size regulated with consequent control of the physical properties of the finished product. Moreover, when applied to the precipitation of crude lithopone, our novel process permits the production of uniform lithopone of desired zinc oxide content and of excellent color and texture from polysulfide sulfur contaminated barium sulfide liquors, which when employed in prior art lithopone precipitation processes result in lithopone pigment deficient in zinc oxide and of poor color and texture.

As many apparently widely different embodiments of this invention may be made without departing from the scope and spirit thereof, it is to be understood that we do not limit ourselves to the specific embodiments thereof except as defined in the appended claim.

Having described the present invention the following is claimed as new and useful.

In a process for the production of solids from a body of a reactive liquor and a body of a reactive solid in suspension, the steps which comprise forcing at least one of said body of reactants through at least one jet nozzle at a velocity of at least about 40 feet per second through a body of gas into a body of liquor, said jet nozzle being positioned less than about 12 inches from the surface of said body of liquor and withdrawing a portion of said body of liquor and returning same through at least one jet during the interaction of said reactive liquor and said reactive solid.

RAYMOND H. FLECKENSTEIN.
ALBERT T. MERTES.